(12) United States Patent
Hosseini et al.

(10) Patent No.: US 11,071,099 B2
(45) Date of Patent: Jul. 20, 2021

(54) RELIABLE INDICATION OF A CONTROL FORMAT INDICATOR VALUE

(71) Applicant: QUALCOMM Incorporated, San Diego, CA (US)

(72) Inventors: Seyedkianoush Hosseini, San Diego, CA (US); Umesh Phuyal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/370,672

(22) Filed: Mar. 29, 2019

(65) Prior Publication Data
US 2019/0313381 A1 Oct. 10, 2019

Related U.S. Application Data

(60) Provisional application No. 62/653,124, filed on Apr. 5, 2018.

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0094* (2013.01)

(58) Field of Classification Search
CPC ... H04W 72/02; H04W 72/04; H04W 72/042; H04L 5/0007; H04L 5/0094
See application file for complete search history.

(56) References Cited

U.S. PATENT DOCUMENTS

| 2012/0076043 A1* | 3/2012 | Nishio | H04L 1/1861 370/252 |
| 2013/0010741 A1* | 1/2013 | Dai | H04W 80/02 370/329 |

(Continued)

FOREIGN PATENT DOCUMENTS

WO 2011103483 A1 8/2011

OTHER PUBLICATIONS

Ericsson: "Techniques for downlink control in URLCC," 3GPP Draft; R1-1802818—Techniques for downlink control in URLLC, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 16, 2018, XP051397363, 10 pages, Retrieved from the Internet: URL:http://www.3gpp.org/ftp/tsg%5Fran/WG1%5FRL1/TSGR1%5F92/Docs/ [retrieved on Feb. 16, 2018] Chapter 2.1.

(Continued)

*Primary Examiner* — Candal Elpenord
(74) *Attorney, Agent, or Firm* — Harrity & Harrity, LLP/Qualcomm

(57) ABSTRACT

Various aspects of the present disclosure generally relate to wireless communication. In some aspects, a user equipment (UE) receive a first control format indicator (CFI) value in a message that is not carried via a physical control format indicator channel (PCFICH); may determine whether the UE is operating using at least one of a first configuration with which the first CFI value is to be used or a second configuration with which a second CFI value, indicated in the PCFICH, is to be used; and may operate using at least one of the first CFI value or the second CFI value based at least in part on determining whether the UE is operating using the at least one of the first configuration or the second configuration. Numerous other aspects are provided.

45 Claims, 12 Drawing Sheets

(56) References Cited

U.S. PATENT DOCUMENTS

| | | | |
|---|---|---|---|
| 2013/0094456 A1* | 4/2013 | Ng | H04L 5/0091 |
| | | | 370/329 |
| 2015/0245246 A1* | 8/2015 | Golitschek Edler von Elbwart | H04W 28/065 |
| | | | 370/280 |
| 2015/0296488 A1* | 10/2015 | Shimezawa | H04L 5/0094 |
| | | | 370/329 |
| 2020/0045680 A1* | 2/2020 | Ren | H04W 72/042 |
| 2020/0305129 A1* | 9/2020 | Lee | H04W 72/042 |

OTHER PUBLICATIONS

International Search Report and Written Opinion—PCT/US2019/025164—ISA/EPO—dated Aug. 16, 2019.

* cited by examiner

RELIABLE INDICATION OF A CONTROL FORMAT INDICATOR VALUE

CROSS-REFERENCE TO RELATED APPLICATIONS UNDER 35 U.S.C. § 119

This application claims priority to U.S. Provisional Patent Application No. 62/653,124, filed on Apr. 5, 2018, entitled "TECHNIQUES AND APPARATUSES FOR RELIABLE INDICATION OF A CONTROL FORMAT INDICATOR VALUE," which is hereby expressly incorporated by reference herein.

FIELD OF THE DISCLOSURE

Aspects of the present disclosure generally relate to wireless communication, and more particularly to techniques and apparatuses for reliable indication of a control format indicator (CFI) value.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a control format indicator (CFI) value in a radio resource control (RRC) message or a system information block (SIB); and using the CFI value received in the RRC message or the SIB regardless of a configuration with which the UE is operating.

In some aspects, a user equipment for wireless communication may include memory and one or more processors operatively coupled to the memory. The memory and the one or more processors may be configured to receive a CFI value in an RRC message or a SIB; and use the CFI value received in the RRC message or the SIB regardless of a configuration with which the UE is operating.

In some aspects, a non-transitory computer-readable medium may store one or more instructions for wireless communication. The one or more instructions, when executed by one or more processors of a user equipment, may cause the one or more processors to receive a CFI value in an RRC message or a SIB; and use the CFI value received in the RRC message or the SIB regardless of a configuration with which the UE is operating.

In some aspects, an apparatus for wireless communication may include means for receiving a CFI value in an RRC message or a SIB; and means for using the CFI value received in the RRC message or the SIB regardless of a configuration with which the apparatus is operating.

In some aspects, a method of wireless communication, performed by a UE, may include receiving a first CFI value in a message that is not carried via a physical control format indicator channel (PCFICH); determining whether the UE is operating using at least one of a first configuration with which the first CFI value is to be used or a second configuration with which a second CFI value, indicated in the PCFICH, is to be used; and operating using at least one of the first CFI value or the second CFI value based at least in part on determining whether the UE is operating using the at least one of the first configuration or the second configuration.

In some aspects, a user equipment for wireless communication may include memory and one or more processors operatively coupled to the memory. The memory and the one or more processors may be configured to receive a first CFI value in a message that is not carried via a PCFICH; determine whether the UE is operating using at least one of a first configuration with which the first CFI value is to be used or a second configuration with which a second CFI value, indicated in the PCFICH, is to be used; and operate using at least one of the first CFI value or the second CFI value based at least in part on determining whether the UE is operating using the at least one of the first configuration or the second configuration.

In some aspects, a non-transitory computer-readable medium may store one or more instructions for wireless communication. The one or more instructions, when executed by one or more processors of a user equipment, may cause the one or more processors to receive a first CFI value in a message that is not carried via a PCFICH; determine whether the UE is operating using at least one of a first configuration with which the first CFI value is to be used or a second configuration with which a second CFI value, indicated in the PCFICH, is to be used; and operate using at least one of the first CFI value or the second CFI value based at least in part on determining whether the UE is operating using the at least one of the first configuration or the second configuration.

In some aspects, an apparatus for wireless communication may include means for receiving a first CFI value in a message that is not carried via a PCFICH; means for determining whether the apparatus is operating using at least one of a first configuration with which the first CFI value is to be used or a second configuration with which a second CFI value, indicated in the PCFICH, is to be used; and means for operating using at least one of the first CFI value or the second CFI value based at least in part on determining whether the apparatus is operating using the at least one of the first configuration or the second configuration.

In some aspects, a method of wireless communication, performed by a UE, may include receiving, in a message, an indication of a first set of subframes to which a first CFI value is to be applied; receiving, in the message, an indication of a second set of subframes to which a second CFI value is to be applied; and selectively using the first CFI value or the second CFI value for a subframe based at least in part on whether the subframe is included in the first set of subframes or the second set of subframes.

In some aspects, a user equipment for wireless communication may include memory and one or more processors operatively coupled to the memory. The memory and the one or more processors may be configured to receive, in a message, an indication of a first set of subframes to which a first CFI value is to be applied; receive, in the message, an indication of a second set of subframes to which a second CFI value is to be applied; and selectively use the first CFI value or the second CFI value for a subframe based at least in part on whether the subframe is included in the first set of subframes or the second set of subframes.

In some aspects, a non-transitory computer-readable medium may store one or more instructions for wireless communication. The one or more instructions, when executed by one or more processors of a user equipment, may cause the one or more processors to receive, in a message, an indication of a first set of subframes to which a first CFI value is to be applied; receive, in the message, an indication of a second set of subframes to which a second CFI value is to be applied; and selectively use the first CFI value or the second CFI value for a subframe based at least in part on whether the subframe is included in the first set of subframes or the second set of subframes.

In some aspects, an apparatus for wireless communication may include means for receiving, in a message, an indication of a first set of subframes to which a first CFI value is to be applied; means for receiving, in the message, an indication of a second set of subframes to which a second CFI value is to be applied; and means for selectively using the first CFI value or the second CFI value for a subframe based at least in part on whether the subframe is included in the first set of subframes or the second set of subframes.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
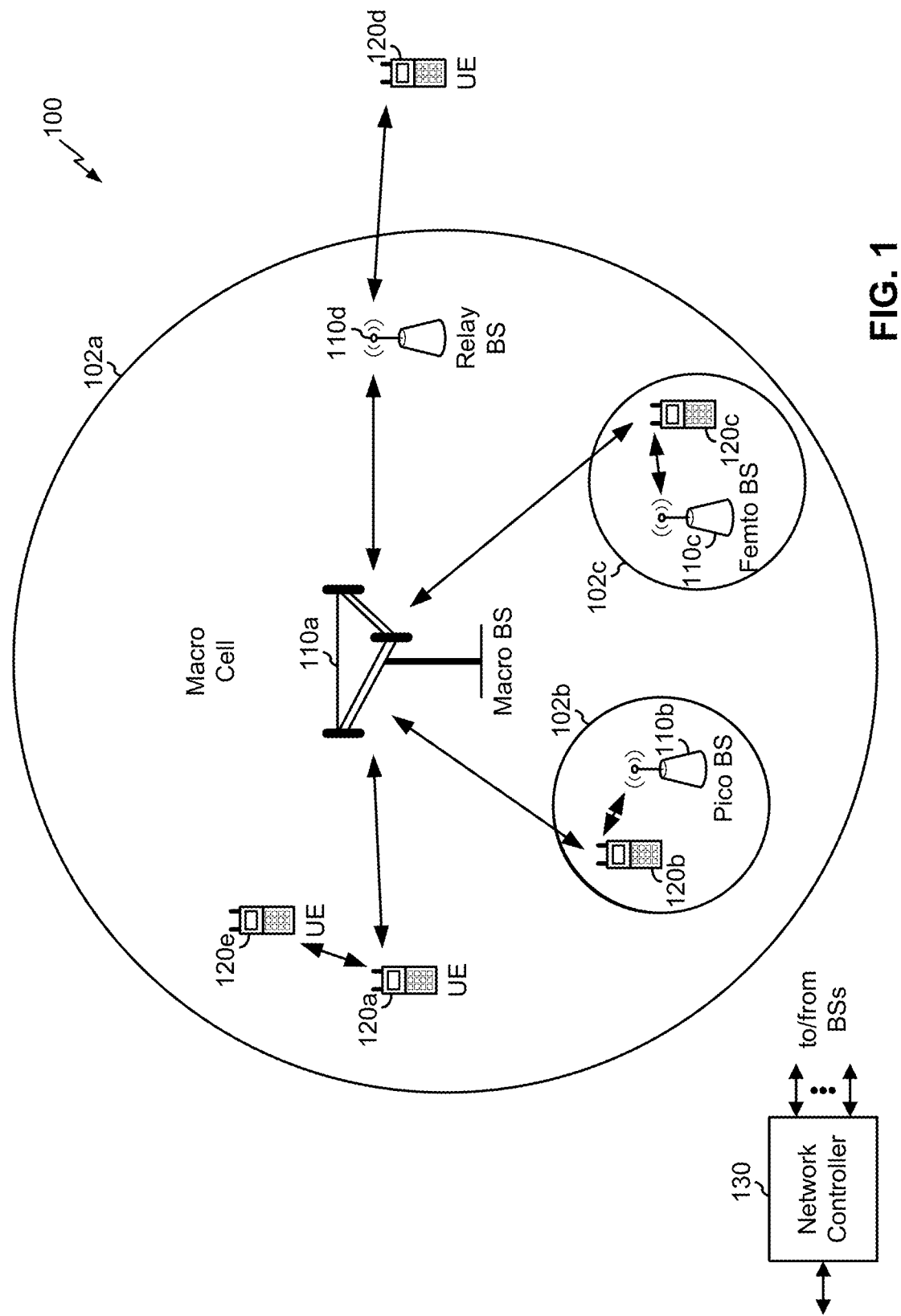
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
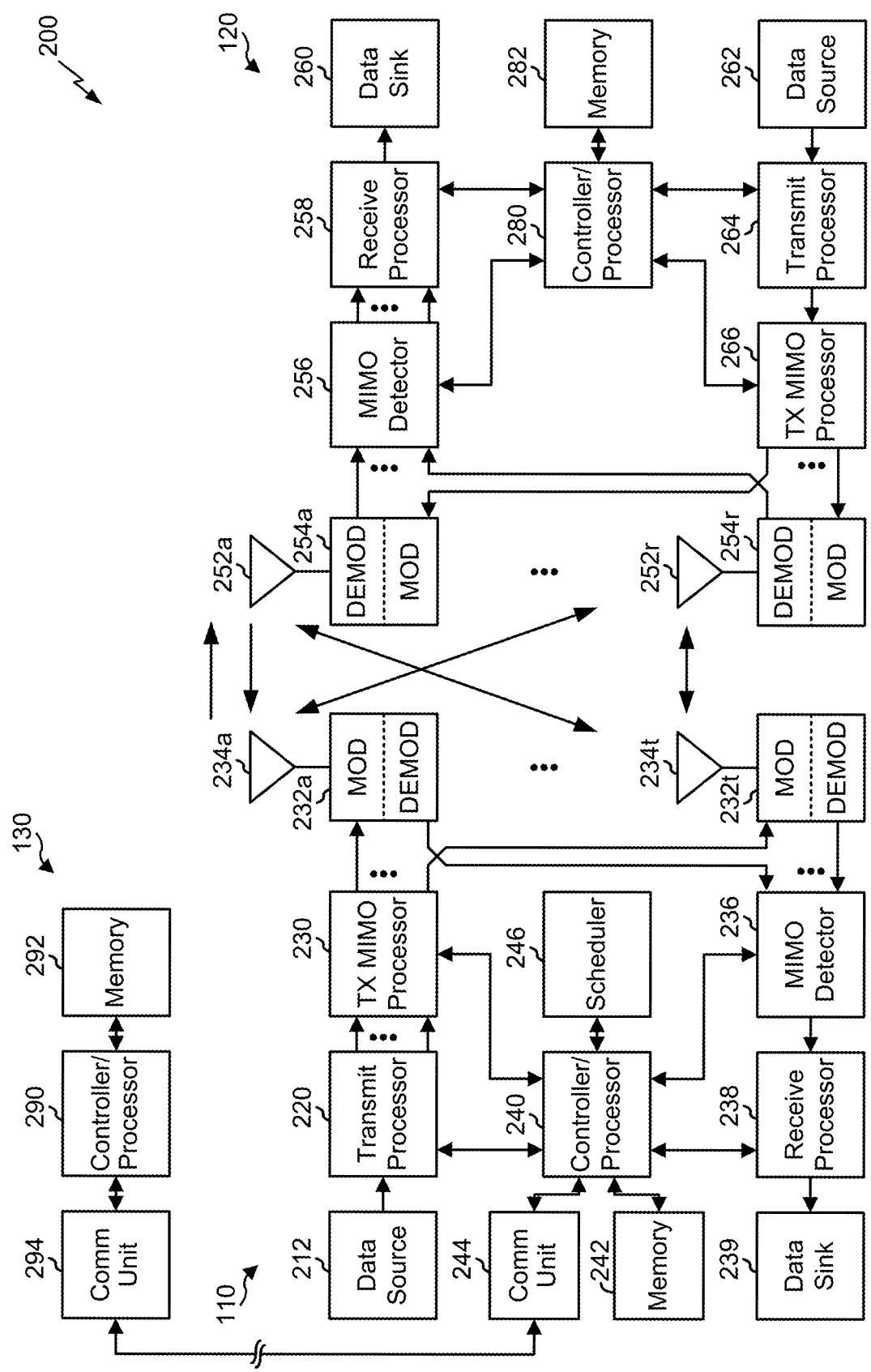
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with reliable indication of a CFI value, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a control format indicator (CFI) value in a radio resource control (RRC) message or a system information block (SIB); means for using the CFI value received in the RRC message or the SIB regardless of a configuration with which the UE 120 is operating; and/or the like. Additionally, or alternatively, UE 120 may include means for receiving a first CFI value in a message that is not carried via a physical control format indicator channel (PCFICH); means for determining whether the UE 120 is operating using at least one of a first configuration with which the first CFI value is to be used or a second configuration with which a second CFI value, indicated in the PCFICH, is to be used; means for operating using at least one of the first CFI value or the second CFI value based at least in part on determining whether the UE 120 is operating using the at least one of the first configuration or the second configuration; and/or the like. Additionally, or alternatively, UE 120 may include means for receiving, in a message, an indication of a first set of subframes to which a first CFI value is to be applied; means for receiving, in the message, an indication of a second set of subframes to which a second CFI value is to be applied; and means for selectively using the first CFI value or the second CFI value for a subframe based at least in part on whether the subframe is included in the first set of subframes or the second set of subframes. Additionally, or alternatively, UE 120 may include means for receiving a first CFI value, for one or more component carriers of the UE 120, in a message that is not carried via a physical control format indicator channel (PCFICH); means for determining whether the one or more component carriers are operating using at least one of a first configuration with which the first CFI value is to be used or a second configuration with which a second CFI value, indicated in the PCFICH, is to be used; means for operating using at least one of the first CFI value or the second CFI value based at least in part on determining whether the one or more component carriers are operating using the at least one of the first configuration or the second configuration; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
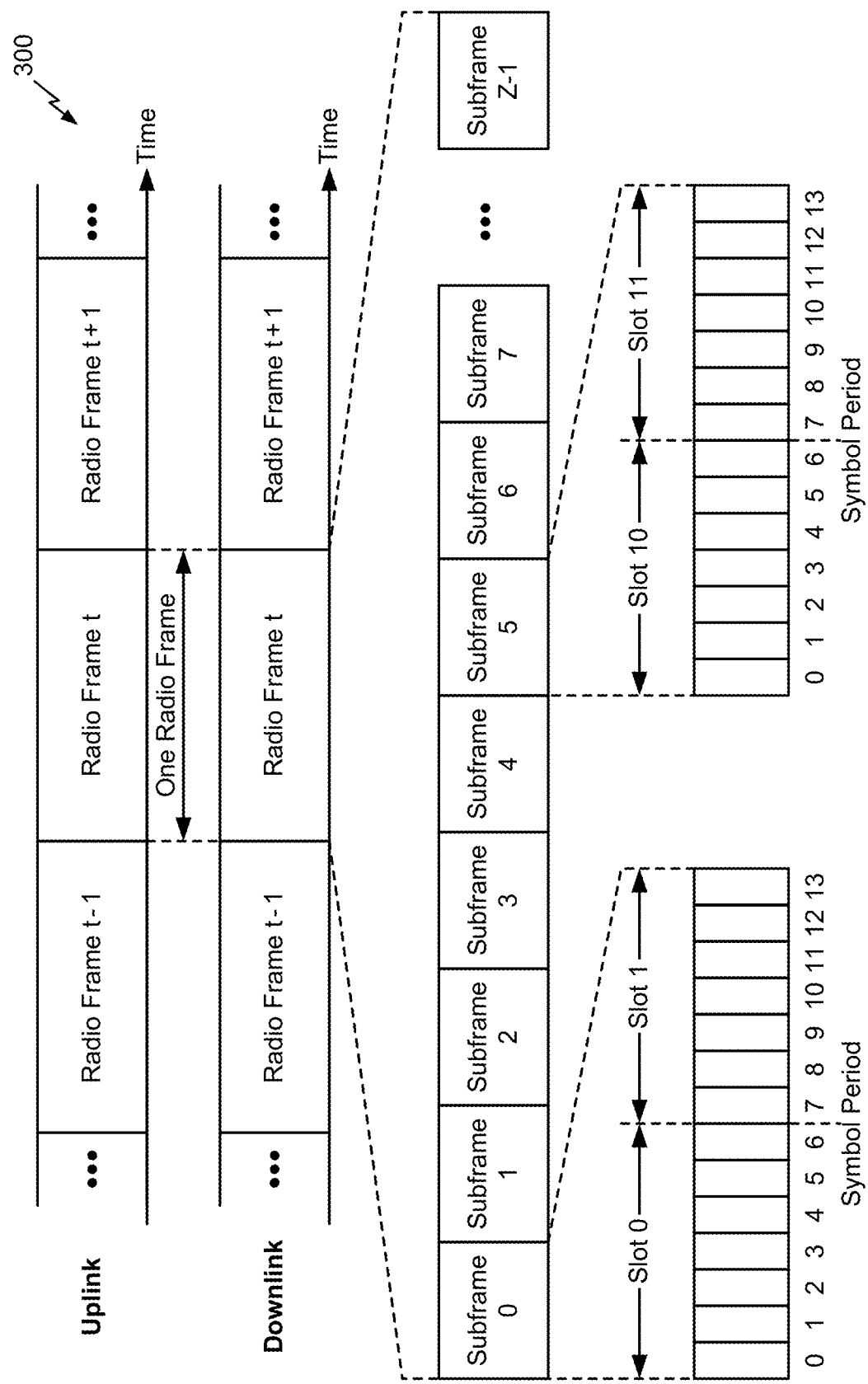
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A) or a different number of symbols periods. In a case where the subframe includes two slots, the subframe may include 2L symbol periods, where the 2L symbol periods in each subframe may be assigned indices of 0 through 2L-1. In some aspects, a subframe may include 14 symbols. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of transmission time intervals (TTIs) or shortened TTIs (sTTIs), which may be referred to using terms other than "frame," "subframe," "slot," and/or the like in 5G NR. In some aspects, a TTI may refer to a periodic time-bounded communication unit defined by a wireless communication standard and/or protocol. Additionally, or alternatively, different configurations of TTIs than those shown in FIG. 3A may be used, such as an sTTI with a length that can be flexibly configured (e.g., 2 symbols, 3 symbols, and/or the like).

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs. The base station may also transmit a physical control format indicator channel (PCFICH) to indicate a subframe format and/or a subframe layout using a control format indicator (CFI), as described in more detail elsewhere herein.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
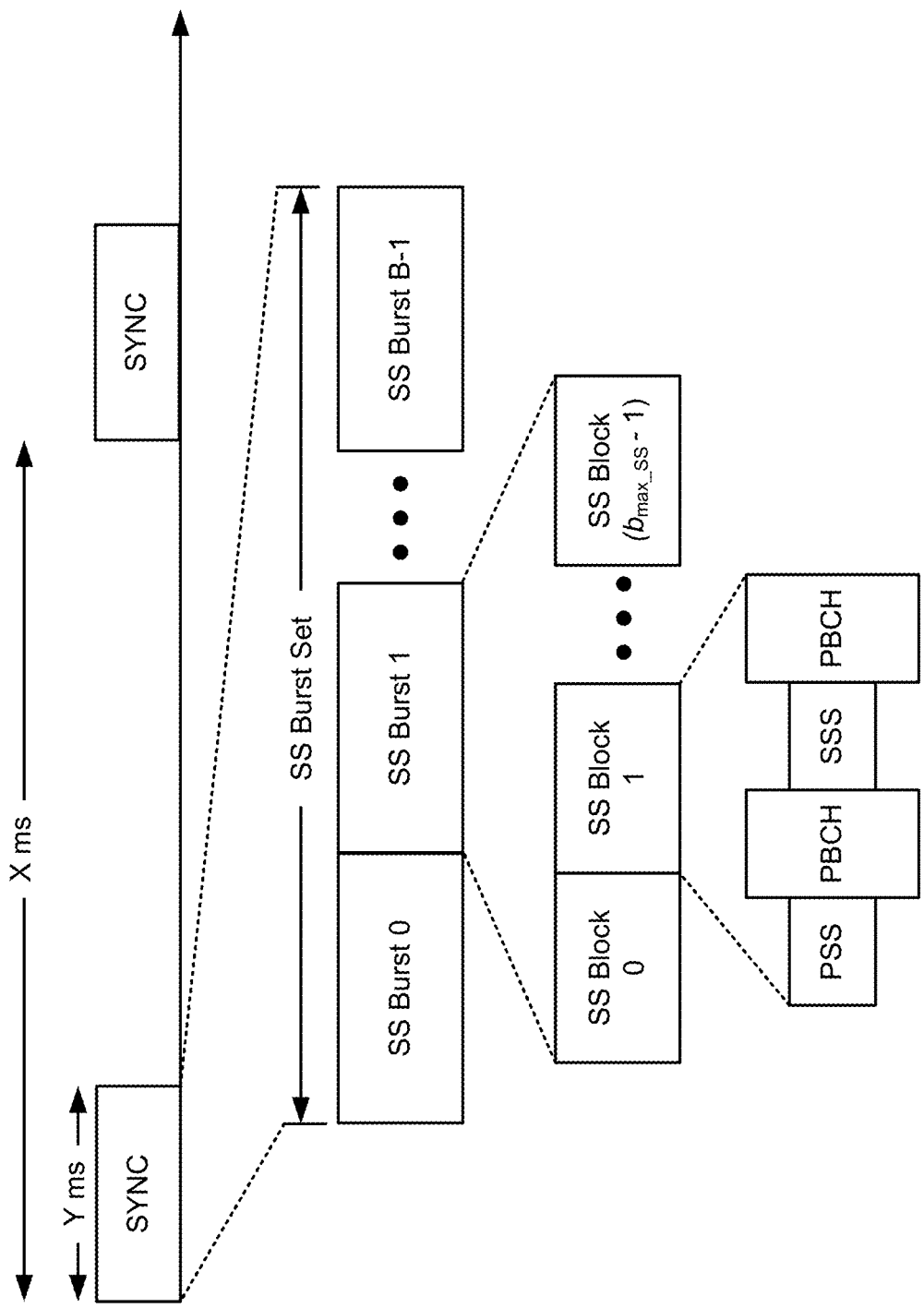
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
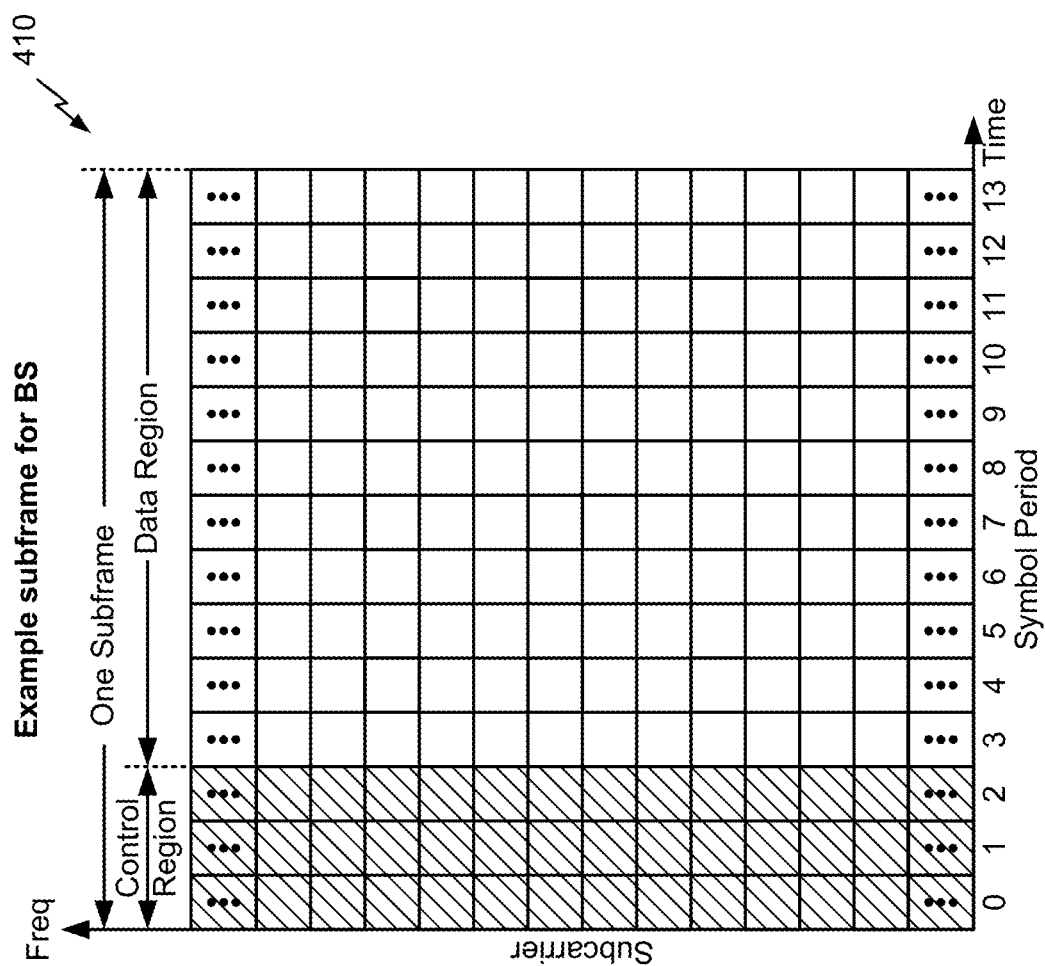
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
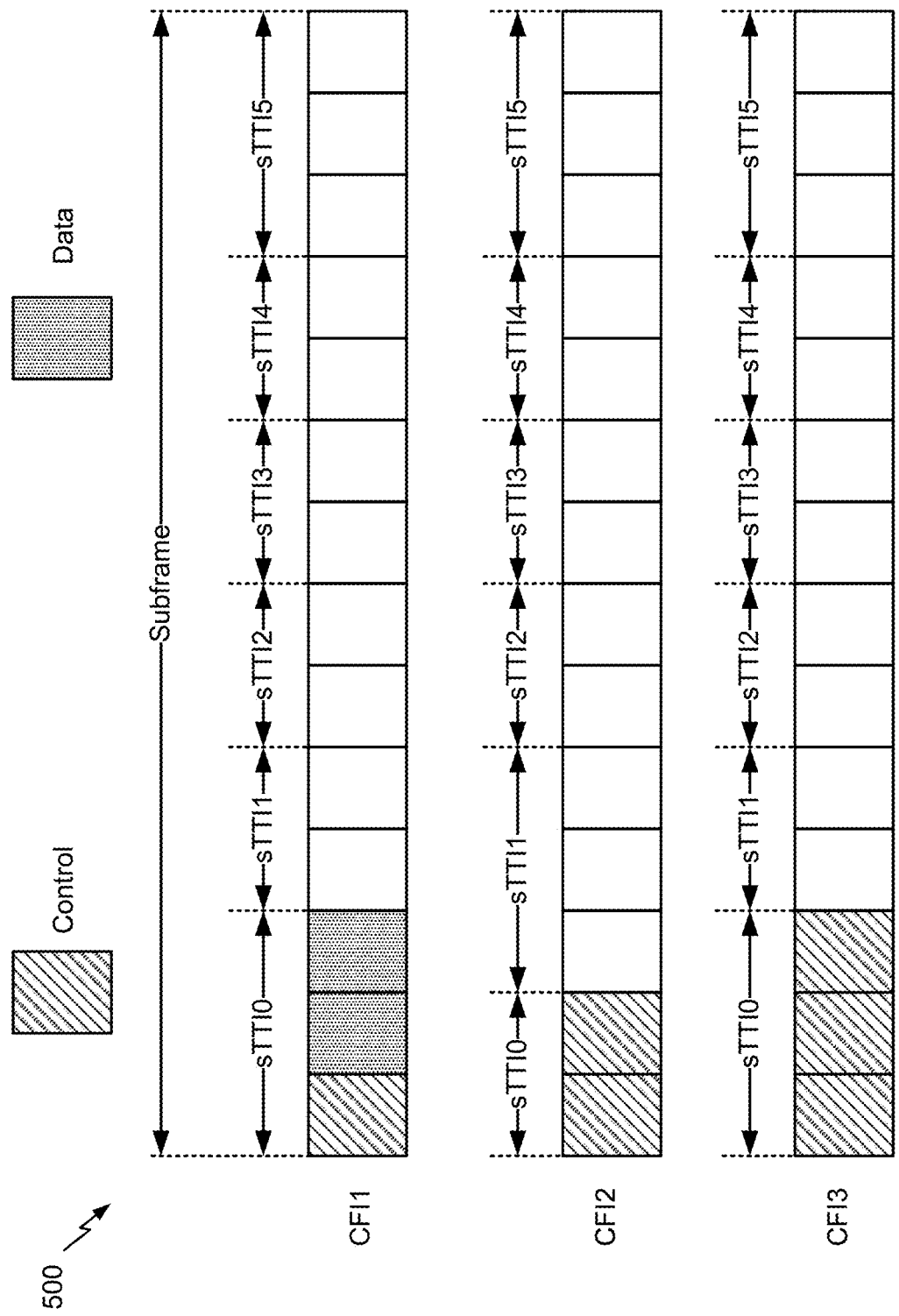
FIG. 5 is a diagram illustrating example subframe formats corresponding to different control format indicator (CFI) values, in accordance with various aspects of the present disclosure.

FIG. 5 is a diagram illustrating example subframe formats 500 corresponding to different control format indicator (CFI) values, in accordance with various aspects of the present disclosure.

As shown in FIG. 5, different CFI values may be used to indicate different subframe formats (also referred to as subframe layouts, downlink layouts, and/or the like) to a UE 120. For example, a CFI value of 1 (shown as CFI1) may indicate that the first sTTI (shown as sTTI0) in a subframe is three symbols in length, that the first symbol carries control information, and that the second and third symbols carry data. Similarly, a CFI value of 2 (shown as CFI2) may indicate that the first sTTI in a subframe is two symbols in length, and that both symbols carry control information. Finally, a CFI value of 3 (shown as CFI3) may indicate that the first sTTI in a subframe is three symbols in length, and that all three symbols carry control information. Although the CFI values are shown as indicating different subframe layouts for sTTI configurations, the CFI values may additionally or alternatively indicate different subframe layouts for other configurations, such as a TTI configuration, a URLLC configuration, an eMBB configuration, and/or the like.

The UE 120 may use the CFI value to identify a subframe format. For example, the UE 120 may use the CFI value to identify a pattern of slots, TTIs, sTTIs, and/or the like that are included in a subframe. Additionally, or alternatively, the UE 120 may use the CFI value to identify a number of symbols that are included in different slots, TTIs, sTTIs, and/or the like for the subframe. Additionally, or alternatively, the UE 120 may use the CFI value to identify one or more symbols (e.g., of the first three symbols of the subframe) that include control information. For example, the UE 120 may determine that only the first symbol of the subframe includes control information when the CFI value is 1, that only the first and second symbols of the subframe include control information when the CFI value is 2, or that only the first three symbols include control information when the CFI value is 3. Similarly, the UE 120 may use the CFI value to identify one or more symbols (e.g., of the first three symbols of the subframe) that include data. Based at least in part on identifying the subframe format, the UE 120 may correctly obtain the control information and/or the data.

In some aspects, the CFI value may be indicated in a physical control format indicator channel (PCFICH) that carries the CFI. For example, a base station 110 may indicate the CFI in the PCFICH, and the UE 120 may decode the PCFICH to obtain the CFI. However, if the UE 120 decodes the PCFICH incorrectly, then the UE 120 may determine the wrong subframe format, which may lead to errors, increased latency, reduced reliability, and/or the like. Thus, in some aspects, the base station 110 may indicate a CFI value to the UE 120 in a non-PCFICH message, such as a radio resource control (RRC) message (e.g., an RRC configuration message indicated using a dedicated RRC connection), a system information block (SIB), and/or the like. In this way, the UE 120 may be more likely to obtain the correct CFI value and determine the correct subframe format, which may reduce errors, reduce latency, increase reliability, and/or the like. This may assist with satisfying latency and/or reliability requirements for different configurations, such as a URLLC configuration and/or the like.

However, a UE 120 (e.g., a URLLC-capable UE) may operate using a variety of configurations, such as a URLLC configuration, a non-URLLC configuration (e.g., an eMBB configuration and/or the like), an sTTI configuration, a TTI configuration (e.g., a legacy TTI configuration with 1 ms subframes), various carrier aggregation configurations, and/or the like. Thus, the UE 120 may need to support 5G operations, 4G operations (e.g., legacy operations), and/or the like, which may involve decoding the PCFICH to obtain a CFI value. Furthermore, the UE 120 may need to be flexibly configured for CFI usage to support these various configurations. Some techniques and apparatuses described herein permit a UE 120 to be flexibly configured to use CFI values received in different ways to provide full compatibility over a variety of configurations, and to satisfy various requirements of different configurations.

As indicated above, FIG. 5 is provided as an example. Other examples may differ from what is described with respect to FIG. 5.

Figure 6:
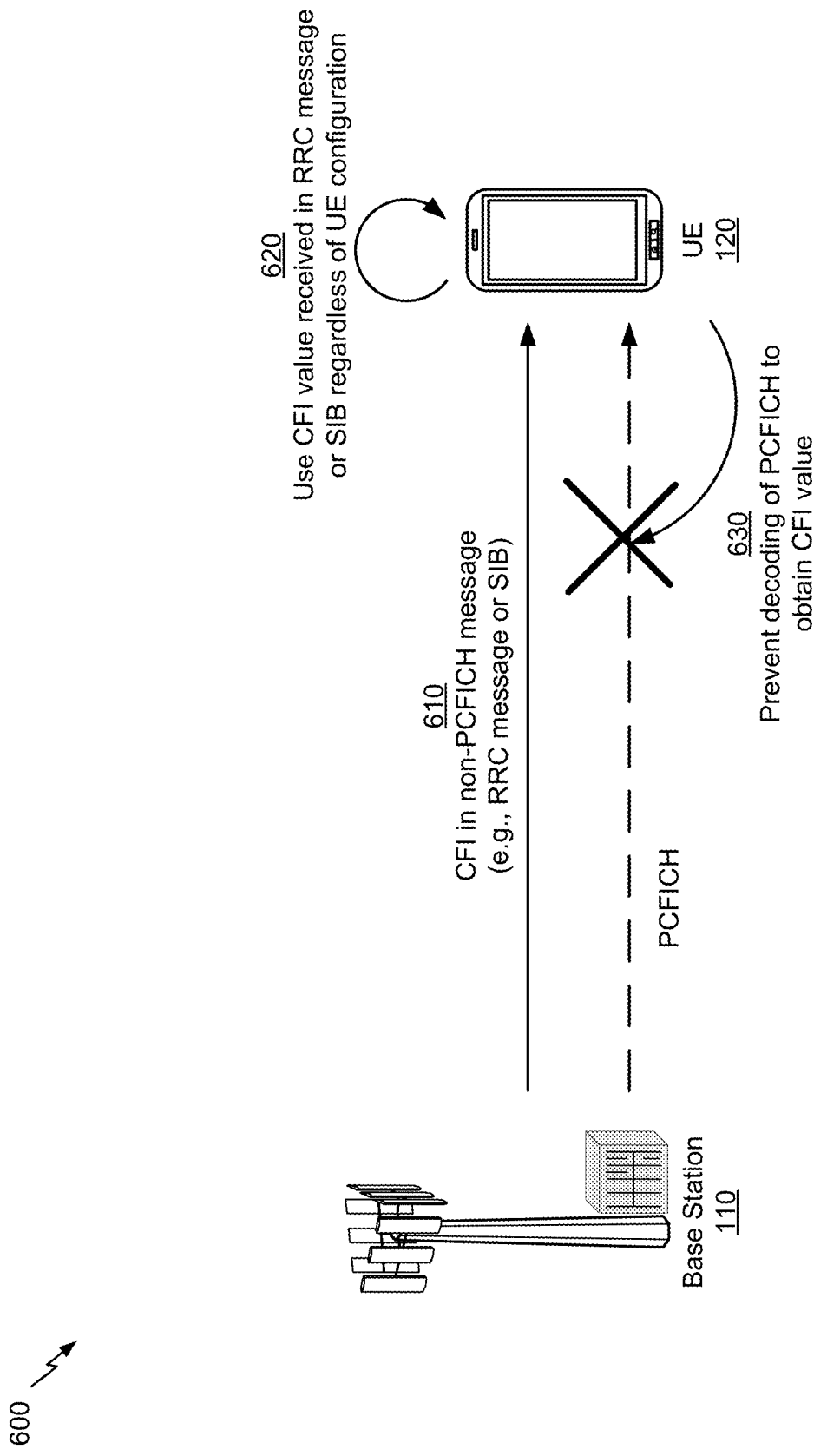
FIGS. 6-8 are diagrams illustrating examples of reliable indication of a CFI value, in accordance with various aspects of the present disclosure.

FIG. 6 is a diagram illustrating an example 600 of reliable indication of a CFI value, in accordance with various aspects of the present disclosure.

As shown by reference number 610, a base station 110 may transmit, and a UE 120 may receive, a CFI value in a non-PCFICH message, such as a radio resource control (RRC) message (e.g., a UE-specific message), a system information block (SIB) (e.g., a cell-specific message), and/or the like. Thus, the non-PCFICH message may be cell-specific in some aspects (e.g., may be configured per cell). In some aspects, the base station 110 may transmit, and the UE 120 may receive, the CFI value in the non-PCFICH message based at least in part on a determination that the UE 120 is configured to operate using a configuration with which the CFI value in the non-PCFICH message is to be used, such as a URLLC configuration, an sTTI configuration, and/or the like. In some aspects, if the UE 120 is not configured with such a configuration (e.g., is operating only using an eMBB configuration, a legacy TTI configuration, and/or the like), then the base station 110 may not indicate the CFI value in the non-PCFICH message, or the UE 120 may not use the CFI value in the non-PCFICH message if the CFI value is indicated in the non-PCFICH message.

As shown by reference number 620, the UE 120 may use the CFI value received in the non-PCFICH message regardless of a configuration with which the UE 120 is operating. For example, the UE 120 may use the CFI value received in the non-PCFICH message for a URLLC configuration, an eMBB configuration, a legacy TTI configuration, a 1 millisecond TTI configuration, an sTTI configuration, a configuration with a latency requirement that satisfies a threshold, a configuration with a reliability requirement that satisfies a threshold, a carrier aggregation configuration, a dual connectivity configuration, and/or the like. In some aspects, a URLLC configuration and/or an sTTI configuration may be referred to using associated DCI formats, such as DCI formats 7-0x and 7-1x. Similarly, an eMBB configuration and/or a legacy TTI configuration may be referred to using associated DCI formats (e.g., other than DCI formats 7-0x and 7-1x). In some aspects, the UE 120 may use the CFI value received in the non-PCFICH message for all of these configurations.

In some aspects, the UE 120 may use the CFI value received in the non-PCFICH message to determine a subframe format (e.g., a subframe layout, a downlink layout, and/or the like), as described above in connection with FIG. 5. The subframe format may be used to communicate with the base station 110, such as to receive downlink control information (DCI) (e.g., in a PDCCH), to receive downlink data (e.g., in a PDSCH), and/or the like. Additionally, or alternatively, the UE 120 may use the CFI value to identify one or more symbols that include control information and/or data, and/or to obtain the control information and/or the data, as described above in connection with FIG. 5.

As shown by reference number 630, the UE 120 may prevent decoding of the PCFICH based at least in part on receiving the CFI value in the non-PCFICH message. For example, because the UE 120 uses the CFI value received in the non-PCFICH message for all configurations, the UE 120 may not need to obtain a CFI value from the PCFICH (e.g., because the CFI value in the PCFICH will not be used for any configurations). In this way, the UE 120 may conserve resources of the UE that would otherwise be used to decode the PCFICH (e.g., memory, processing power, battery power, and/or the like).

In some aspects, if the base station 110 transmits the CFI value in the non-PCFICH message, then the base station 110 may prevent transmission of a CFI value in the PCFICH. For example, if the base station 110 determines that the UE 120 is to use the CFI value in the non-PCFICH message for all configurations of the UE, then the base station 110 may prevent transmission of a CFI value on the PCFICH (e.g., because such CFI value on the PCFICH would not be used by the UE 120). In this way, the base station 110 may conserve network resources and resources of the base station 110 (e.g., memory, processing power, and/or the like).

In some aspects, the non-PCFICH message may include multiple CFI values, and the UE 120 may select a CFI value, from the multiple CFI values, to be used. For example, the non-PCFICH message may include multiple CFI values, and each CFI value may correspond to a different subframe set, as described in more detail below in connection with FIGS. 7 and 8.

As indicated above, FIG. 6 is provided as an example. Other examples may differ from what is described with respect to FIG. 6.

Figure 7:
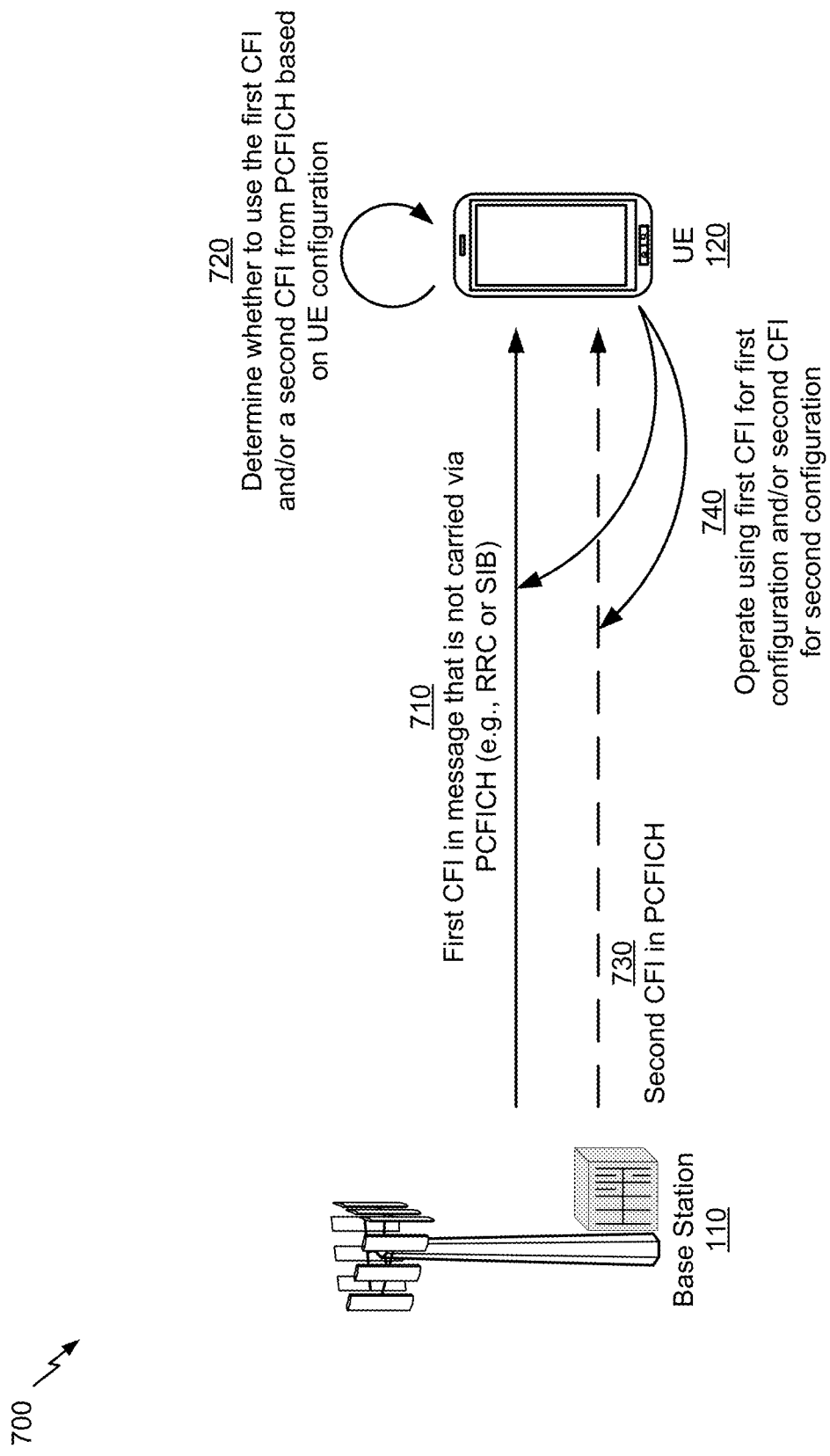

FIG. 7 is a diagram illustrating another example 700 of reliable indication of a CFI value, in accordance with various aspects of the present disclosure.

As shown by reference number 710, a base station 110 may transmit, and a UE 120 may receive, a first CFI value in a non-PCFICH message (e.g., a message that is not carried via the PCFICH), such as an RRC message, a SIB (e.g., a message carried in a SIB), and/or the like. As described above in connection with FIG. 6, in some aspects, the CFI value may only be indicated in the non-PCFICH message (e.g., an RRC message) if the UE 120 is configured to operate using a configuration with which the CFI value in the non-PCFICH message is to be used, such as a URLLC configuration, an sTTI configuration, and/or the like.

In some aspects, the non-PCFICH message may include multiple CFI values, and the UE 120 may select the first CFI value from the multiple CFI values. For example, the non-PCFICH message may include multiple CFI values, where each CFI value corresponds to a different subframe set. The different subframe sets may each include a mutually exclusive set of subframes. For example, the non-PCFICH message may indicate one CFI value to be used for a first set of subframes, may indicate another CFI value to be used for a second set of subframes, and so on. The UE 120 may determine whether a subframe set to which a subframe in which the UE 120 is operating belongs (e.g., a subframe for which the UE 120 needs a CFI value to determine a format of the subframe), and may identify a CFI value that corresponds to that subframe set. Additional details are provided below in connection with FIG. 8.

As shown by reference number 720, the UE 120 may determine whether the UE is operating using a first configuration with which the first CFI value is to be used and/or a second configuration with which a second CFI value, indicated in the PCFICH, is to be used. In some aspects, the first configuration may include, for example, a URLLC configuration, an sTTI configuration, a configuration with a latency requirement that is less than or equal to a threshold, a configuration with a reliability requirement that is greater than or equal to a threshold, a configuration where all component carriers of the UE 120 are configured using CFI value(s) indicated in the non-PCFICH message, and/or the like. Additionally, or alternatively, the second configuration may include, for example, an eMBB configuration, a legacy TTI configuration, a configuration with a latency requirement that is greater than or equal to a threshold, a configuration with a reliability requirement that is less than or equal to a threshold, a configuration where no component carriers of the UE 120 are configured using CFI value(s) indicated in the non-PCFICH message (e.g., a configuration where all component carriers of the UE 120 are configured using CFI value(s) indicated in the PCFICH), and/or the like.

As shown by reference number 730, in some aspects, the base station 110 may transmit the second CFI value in the PCFICH. The UE 120 may decode the PCFICH to obtain the second CFI value if the UE 120 is operating using the second configuration, as described in more detail below.

As shown by reference number 740, the UE 120 may operate using the first CFI value and/or the second CFI value based at least in part on determining whether the UE is operating using the first configuration and/or the second configuration. For example, the UE 120 may operate using only the first CFI value if the UE 120 is operating using only the first configuration. Similarly, the UE 120 may operate using only the second CFI value if the UE 120 is operating using only the second configuration. If the UE 120 is operating using both the first configuration and the second configuration (e.g., simultaneously or concurrently), then the UE 120 may use the first CFI value for the first configuration (e.g., for communications that use the first configuration) and may use the second CFI value for the second configuration (e.g., for communications that use the second configuration).

In this way, the first CFI value indicated in the non-PCFICH message (e.g., which may be more reliable) may be used for configurations that have a high reliability requirement, a low latency requirement, and/or the like. Conversely, the second CFI value indicated in the PCFICH message (e.g., which may be less reliable) may be used for configurations that do not have a high reliability requirement, a low latency requirement, and/or the like.

In some aspects, if the UE 120 is operating using the first configuration and not the second configuration, then the UE 120 may prevent decoding of the PCFICH. In this case, since the second configuration is not being used, the UE 120 may not need to use the second CFI value, and thus can conserve resources by preventing the PCFICH from being decoded. Conversely, if the UE 120 is operating using the second configuration (e.g., using the second configuration and not the first configuration, or using both the second configuration and the first configuration), then the UE 120 may decode the PCFICH (e.g., because the UE 120 may need the second CFI value to operate using the second configuration).

In some aspects, the second CFI value is required to be less than or equal to the first CFI value (e.g., the second CFI value may be upper bounded by the first CFI value) because the UE 120 may incorrectly interpret control information (e.g., in the second and/or third symbol of a subframe) as data if the second CFI value is greater than the first CFI value. For example, if the first CFI value is 1, then this may indicate that the first symbol of a subframe includes control information, and that the second and third symbols include data, such as URLLC data. However, if the second CFI value is 3, then this may indicate that the first three symbols of the subframe include control information. Thus, in this scenario, the UE 120 may incorrectly interpret the information in the second and third symbols as data, even if the information in the second and third symbols is control information. In this case, the UE 120 may be configured to indicate an error if the UE 120 receives a second CFI value (e.g., indicated in the PCFICH) that is greater than the first CFI value (e.g., indicated in the non-PCFICH message).

In some aspects, if the first CFI value is 3, then the second CFI value may be 1 or 3. In this case, the second CFI value may not be 2 because a CFI value of 2 indicates that the first sTTI of the subframe (e.g., sTTI0) includes two symbols, whereas a CFI value of 3 indicates that the first sTTI of the subframe includes three symbols, as described above in connection with FIG. 5. In some aspects, if the first CFI value is 2, then the second CFI value may be 2 (e.g., the first CFI value and the second CFI value may be required to be the same). In this case, the second CFI value may not be 1 because a CFI value of 1 indicates that the first sTTI of the subframe includes three symbols, whereas a CFI value of 2 indicates that the first sTTI of the subframe includes two symbols, as described above in connection with FIG. 5. In some aspects, if the first CFI value is 1, then the second CFI value may be 1 (e.g., the first CFI value and the second CFI value may be required to be the same). In this way, errors may be reduced, as described above.

In some aspects, one or more techniques described herein may be used in a scenario where the UE 120 is configured to use multiple component carriers (e.g., for carrier aggregation, dual connectivity, and/or the like). In some aspects, all of the component carriers of the UE 120 may be configured using one or more CFI values indicated in the non-PCFICH message, such as when all of the component carriers have the first configuration (e.g., which may be a group-binding configuration that binds all component carriers in a group). In this case, and in some aspects, all of the component carriers of the UE 120 may be configured using a same CFI value included in the non-PCFICH message (e.g., the first CFI value) to simplify signaling and reduce overhead. Alternatively, in some aspects, different component carriers of the UE 120 may be configured using different CFI values indicated in the non-PCFICH message to increase flexibility. In this case, the non-PCFICH message may include multiple CFI values, and different CFI values may correspond to different component carriers of the UE 120.

Alternatively, all of the component carriers of the UE 120 may be configured using one or more CFI values indicated in the PCFICH (e.g., and none of the component carriers may be configured using one or more CFI values indicated in the non-PCFICH message), such as when all of the component carriers have the second configuration (e.g., which may be a group-binding configuration that binds all component carriers in a group). In this case, and in some aspects, a single CFI value indicated in the PCFICH may be used for all (or multiple) component carriers to reduce overhead. Alternatively, in some aspects, the base station 110 may indicate different CFI values in the PCFICH, and the different CFI values may correspond to different component carriers, thereby increasing flexibility.

In some aspects, a first set of component carriers of the UE 120 may operate using the first configuration (e.g., as described above), and a second set of component carriers of the UE 120 may operate using the second configuration (e.g., as described above). In this case, the UE 120 may use a first set of (e.g., one or more) CFI values indicated in the non-PCFICH message for the first set of component carriers, and may use a second set of (e.g., one or more) CFI values indicated in the PCFICH for the second set of component carriers. In a similar manner as described above, the UE 120 may use a single CFI value for all component carriers in the first set, or may use different CFI values for different component carriers in the first set. Similarly, the UE 120 may use a single CFI value for all component carriers in the second set, or may use different CFI values for different component carriers in the second set. In this way, flexibility across different component carriers may be increased.

In some aspects, a secondary cell (e.g., SCell) of the UE 120 may be configured with a CFI value indicated in a non-PCFICH message (e.g., an RRC message) even if the secondary cell operates using the second configuration. In this case, the UE 120 may be required to be configured with another CFI value, indicated in the non-PCFICH message) to be used when the secondary cell operates using the first configuration. Thus, the non-PCFICH message may indicate a CFI value for the first configuration for the secondary cell and a CFI value for the second configuration for the secondary cell, or may indicate a CFI value for the first configuration for the secondary cell without indicating a CFI value for the second configuration for the secondary cell, but may not indicate a CFI value for the second configuration for the secondary cell without indicating a CFI value for the first configuration for the secondary cell. In this case, decoding of the PCFICH can be entirely avoided if the secondary cell is configured with a CFI value for the second configuration via the non-PCFICH message, thereby conserving resources of the UE 120.

By permitting the UE 120 to be flexibly configured to use the first CFI value in the non-PCFICH message for operations that use the first configuration (e.g., a URLLC operation, an sTTI configuration, and/or the like) and/or the second CFI value in the PCFICH for operations that use the second configuration (e.g., an eMBB operation, a legacy TTI operation, and/or the like), the UE 120 may be permitted to operate using a variety of configurations and/or to satisfy a variety of different requirements of different configurations. Furthermore, these techniques may increase flexibility of scheduling control information and/or data, and may lead to fewer wasted resources as opposed to using the same CFI value for all configurations of the UE 120.

As indicated above, FIG. 7 is provided as an example. Other examples may differ from what is described with respect to FIG. 7.

Figure 8:
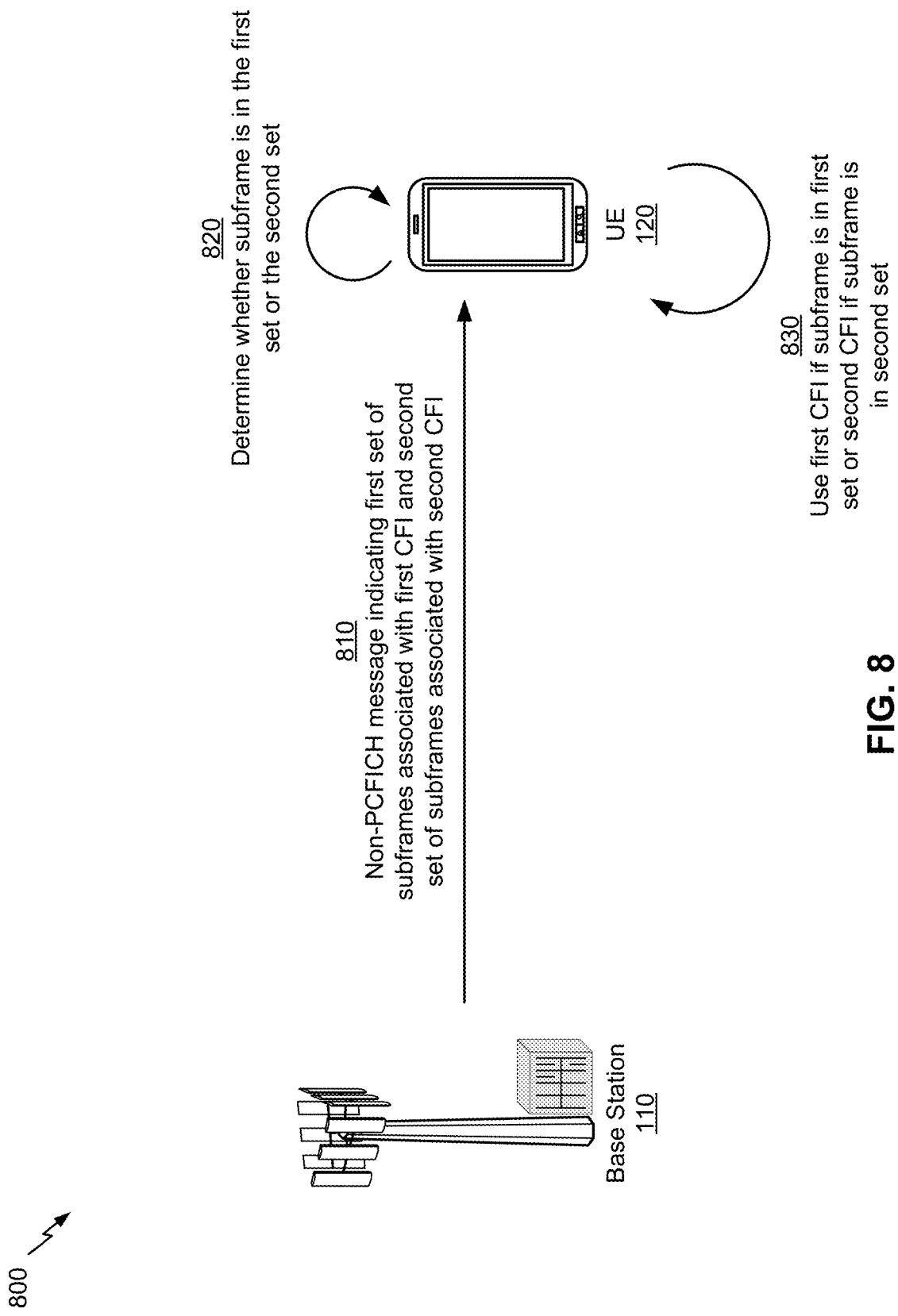

FIG. 8 is a diagram illustrating another example 800 of reliable indication of a CFI value, in accordance with various aspects of the present disclosure.

As shown by reference number 810, a base station 110 may transmit, and a UE 120 may receive, a non-PCFICH message that includes an indication of a first set of subframes to which a first CFI value is to be applied and a second set of subframes to which a second CFI value is to be applied. As described elsewhere herein, the non-PCFICH message may include an RRC message, a SIB message, and/or the like.

In some aspects, the first set of subframes may include only subframes of a first type, and the second set of subframes may include only subframes of a second type. In some aspects, the first type and/or the second type may be indicated in the non-PCFICH message. For example, the first type may be a multicast-broadcast single-frequency network (MBSFN) subframe type. Additionally, or alternatively, the second type may be a non-MBSFN subframe type. In some aspects, an MBSFN subframe may use a maximum of two symbols for downlink control information (e.g., PDCCH symbols), and thus may be differentiated from other types of subframes.

In some aspects, the first CFI value and/or the second CFI value may be indicated in the non-PCFICH message. For example, the non-PCFICH message may indicate the first CFI value and a corresponding first set of subframes to which the first CFI value is to be applied. Similarly, the non-PCFICH message may indicate the second CFI value and a corresponding second set of subframes to which the second CFI value is to be applied. In some aspects, the non-PCFICH message may indicate a particular CFI value using a single bit (e.g., to indicate 2 of the 3 possible CFI values) to reduce overhead. In some aspects, the non-PCFICH message may indicate a particular CFI value using two bits (e.g., to indicate all 3 possible CFI values) to provide full flexibility for CFI indication.

Alternatively, the first CFI value and/or the second CFI value may not be indicated in the non-PCFICH message. In this case, the first CFI value and/or the second CFI value may be hard coded in memory of the UE 120 (e.g., according to a fixed first CFI value and/or a fixed second CFI value indicated in a 3GPP standard). For example, the first CFI value and the second CFI value may be fixed according to a 3GPP specification, and the non-PCFICH message may indicate a first set of subframes to which the first fixed CFI value is to be applied and a second set of subframes to which the second fixed CFI value is to be applied. As another example, one of the CFI values (e.g., the first CFI value) may be fixed according to a 3GPP specification, and another CFI value (e.g., the second CFI value) may be indicated in the non-PCFICH message. For example, the CFI value that applies to MBSFN subframes may be fixed according to the 3GPP specification (e.g., to a CFI value of 2), and the CFI value that applies to non-MBSFN subframes may be indicated in the non-PCFICH message.

In some aspects, the CFI values that apply to the first set of subframes and the second set of subframes may be indicated using a bitmap. For example, each bit in the bitmap may correspond to a subframe within a time window (e.g., 40 bits for 40 subframes in a time window, 10 bits for 10 subframes in a time window, and/or the like). In this case, a first value of a bit (e.g., 0) may indicate that a first CFI value is to be applied to a subframe that corresponds to the bit, and a second value of the bit (e.g., 1) may indicate that the second CFI value is to be applied to a subframe that corresponds to the bit. In some aspects, the bitmap may be a different length for different types of subframes (e.g., a longer bitmap, such as 40 bits, for MBSFN subframes that have fewer CFI options, and a smaller bitmap, such as 10 bits, for non-MBSFN subframes that have more CFI options). The time window for the bitmap may correspond to, for example, a TTI (e.g., frame), multiple TTIs, and/or the like. In some aspects, the pattern indicated by the bitmap may repeat for consecutive time windows. Additionally, or alternatively, the base station 110 may periodically indicate a new pattern using the bitmap. In some aspects, multiple patterns may be preconfigured, and may be indicated using an index value, that maps to a pattern, in the non-PCFICH message.

In some aspects, the non-PCFICH message may indicate a first set of CFI values that map to the first set of subframes, and/or a second set of CFI values that map to the second set of subframes. In some aspects, each value may be indicated using two bits so as to permit indication of the full range of CFI values (e.g., 1, 2, or 3). In this case, a bitmap that maps two bits to one subframe may be used to map the CFI values to subframes. Aspects described above in connection with a bitmap may apply to this indication technique (e.g., different length bitmaps for different types of subframes, a time window for a bitmap, repeating the pattern indicated in the bitmap for consecutive time windows, using an index value to indicate a preconfigured bitmap pattern, and/or the like).

In some aspects, the non-PCFICH message may include an information element that indicates the first CFI value and the second CFI value, may include a first bitmap that maps either the first CFI value or the second CFI value to the first set of subframes, and may include a second bitmap that maps either the first CFI value or the second CFI value to the second set of subframes. In some aspects, each bit in the bitmap may correspond to a single subframe. In this way, some flexibility in CFI indication and subframe format may be achieved while also conserving overhead as compared to mapping two bits to each subframe.

As shown by reference number 820, the UE 120 may determine whether a subframe on which the UE 120 is operating is included in the first set of subframes or the second set of subframes. The subframe may be, for example, a subframe for which the UE 120 needs to use a CFI value to determine the format of the subframe (e.g., before processing signals received in the subframe, to determine whether to interpret the signals as control information or data, and/or the like).

As shown by reference number 830, the UE 120 may selectively use the first CFI value or the second CFI value for a subframe based at least in part on whether the subframe is included in the first set of subframes or the second set of subframes. For example, if the subframe is included in the first set, then the UE 120 may apply the first CFI value, from the non-PCFICH message, to the subframe. Similarly, if the subframe is included in the second set, then the UE 120 may apply the second CFI value, from the non-PCFICH message, to the subframe.

In some aspects, the UE 120 may use the first CFI value or the second CFI value for the subframe based at least in part on a determination that the UE 120 is operating using a first configuration (e.g., a configuration with which a CFI value, indicated in the non-PCFICH message, is to be used), in a similar manner as described above in connection with FIG. 7. Similarly, the UE 120 may use the first CFI value or the second CFI value for the subframe based at least in part on a determination that the UE 120 is not operating using a second configuration (e.g., a configuration with which a CFI value, indicated in the PCFICH, is to be used), in a similar manner as described above in connection with FIG. 7.

In some aspects, one or more techniques described herein may be used in a scenario where the UE 120 is configured to use multiple component carriers (e.g., for carrier aggregation, dual connectivity, and/or the like). In this case, the first set of subframes and the second set of subframes, indicated in the non-PCFICH message, may apply for all component carriers of the UE 120. For example, the non-PCFICH message may indicate a single first set of subframes and a single second set of subframes, and the indicated mapping of CFI values to those sets of subframes may apply to all component carriers of the UE 120. In this way, signaling overhead may be reduced.

Alternatively, different sets of subframes, indicated in the non-PCFICH message, may apply to different component carriers of the UE 120. For example, the non-PCFICH message may indicate multiple first sets of subframes and multiple second sets of subframes, and different mappings of CFI values to the different sets may apply to different component carriers. For example, a mapping of CFI values to the first set of subframes and the second set of subframes may apply for a first component carrier of the UE 120, a mapping of CFI values to a third set of subframes and a fourth set of subframes (e.g., indicated in the non-PCFICH message) may apply to a second component carrier of the UE 120, and/or the like. Additionally, or alternatively, a particular set of subframes may apply to more than one but less than all component carriers of the UE 120. In some aspects, such application may be indicated in the non-PCFICH message. In this way, flexibility in PCFICH indication and subframe format may be increased.

A first set of subframes and a second set of subframes are described herein as an example. In some aspects, the non-PCFICH message may indicate more than two sets of subframes, such as three sets of subframes, four sets of subframes, and/or the like. In this way, flexibility in PCFICH indication and subframe format may be increased.

As indicated above, FIG. 8 is provided as an example. Other examples may differ from what is described with respect to FIG. 8.

Figure 9:
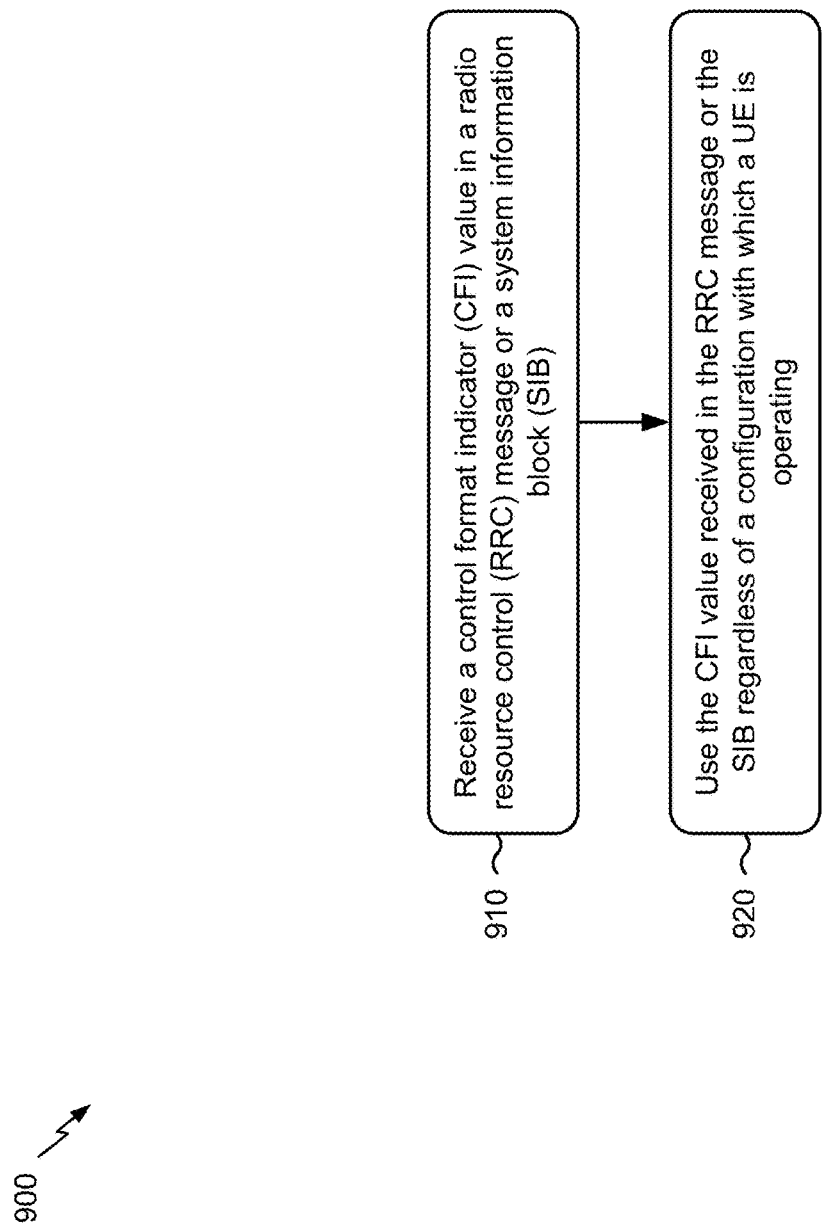
FIGS. 9-11 are diagrams illustrating example processes performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with reliable indication or reception of a CFI value.

As shown in FIG. 9, in some aspects, process 900 may include receiving a control format indicator (CFI) value in a radio resource control (RRC) message or a system information block (SIB) (block 910). For example, the UE (e.g., using antenna 252, DEMOD 254, MIMO detector 256, receive processor 258, controller/processor 280, and/or the like) may receive a CFI value in an RRC message or a SIB, as described above in connection with FIG. 6.

As further shown in FIG. 9, in some aspects, process 900 may include using the CFI value received in the RRC message or the SIB regardless of a configuration with which the UE is operating (block 920). For example, the UE (e.g., using controller/processor 280 and/or the like) may use the CFI value received in the RRC message or the SIB regardless of a configuration with which the UE is operating, as described above in connection with FIG. 6.

Process 900 may include additional aspects, such as any single aspect or any combination of aspects described below and/or in connection with one or more other processes described elsewhere herein.

In a first aspect, the UE receives the CFI value in the RRC message or the SIB based at least in part on being configured with an ultra-reliable low latency communication (URLLC) configuration or a shortened transmission time interval (sTTI) configuration. In a second aspect, alone or in combination with the first aspect, a physical control format indicator channel (PCFICH) is not decoded based at least in part on receiving the CFI value in the RRC message or the SIB. In a third aspect, alone or in combination with one or more of the first and second aspects, the CFI value received in the RRC message or the SIB is used for at least one of: an ultra-reliable low latency communications (URLLC) configuration, an enhanced mobile broadband (eMBB) configuration, a legacy transmission time interval (TTI) configuration, a shortened TTI (sTTI) configuration, a configuration with a latency requirement that satisfies a threshold, a configuration with a reliability requirement that satisfies a threshold, a carrier aggregation configuration, a dual connectivity configuration, or some combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
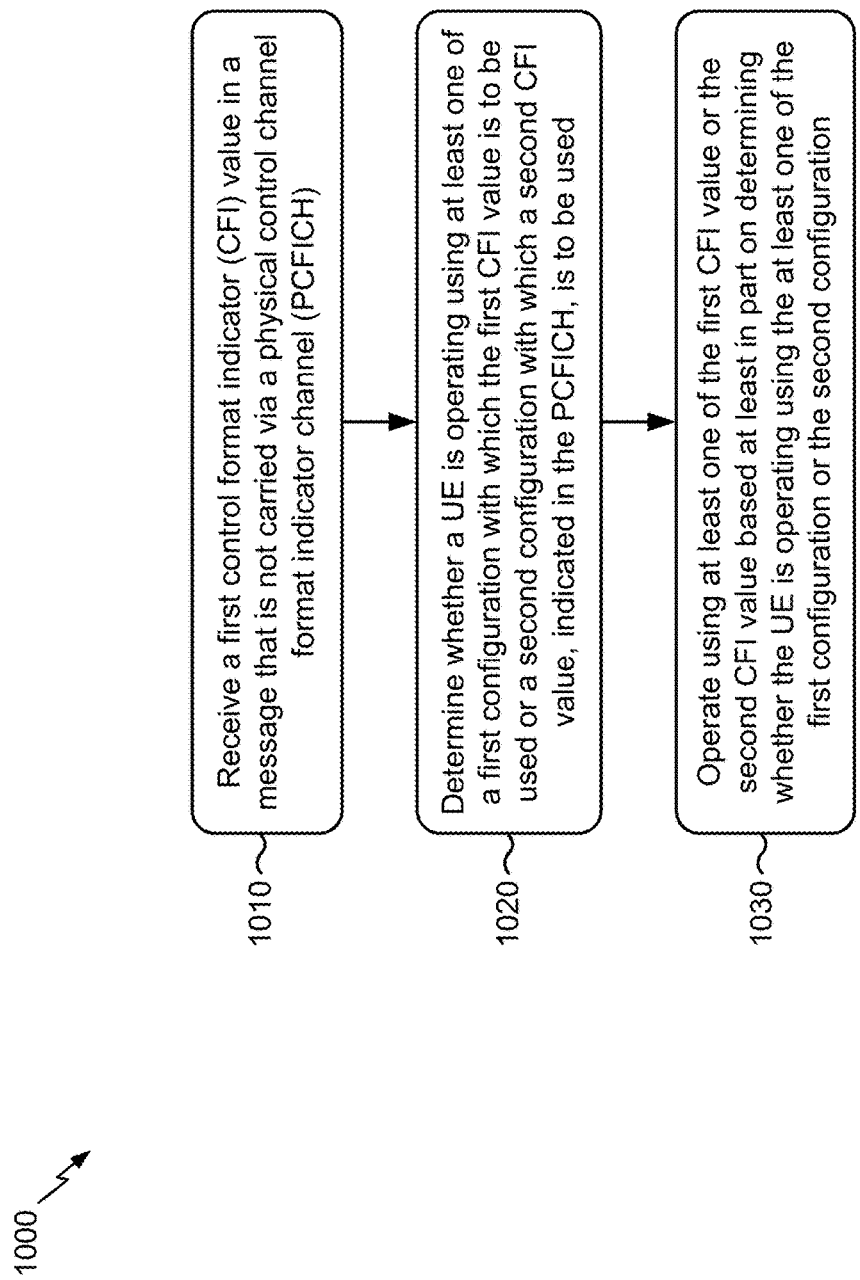

FIG. 10 is a diagram illustrating an example process 1000 performed, for example, by a UE, in accordance with various aspects of the present disclosure. Example process 1000 is an example where a UE (e.g., UE 120 and/or the like) performs operations associated with reliable indication or reception of a CFI value.

As shown in FIG. 10, in some aspects, process 1000 may include receiving a first CFI value in a message that is not carried via a PCFICH (block 1010). For example, the UE (e.g., using antenna 252, DEMOD 254, MIMO detector 256, receive processor 258, controller/processor 280, and/or the like) may receive a first CFI value in a message that is not carried via a PCFICH, as described above in connection with FIG. 7.

As further shown in FIG. 10, in some aspects, process 1000 may include determining whether the UE is operating using at least one of a first configuration with which the first CFI value is to be used or a second configuration with which a second CFI value, indicated in the PCFICH, is to be used (block 1020). For example, the UE (e.g., using controller/processor 280 and/or the like) may determine whether the UE is operating using at least one of a first configuration with which the first CFI value is to be used or a second configuration with which a second CFI value, indicated in the PCFICH, is to be used, as described above in connection with FIG. 7.

As further shown in FIG. 10, in some aspects, process 1000 may include operating using at least one of the first CFI value or the second CFI value based at least in part on determining whether the UE is operating using the at least one of the first configuration or the second configuration (block 1030). For example, the UE (e.g., using controller/processor 280 and/or the like) may operate using at least one of the first CFI value or the second CFI value based at least in part on determining whether the UE is operating using the at least one of the first configuration or the second configuration, as described above in connection with FIG. 7.

Process 1000 may include additional aspects, such as any single aspect or any combination of aspects described below and/or in connection with one or more other processes described elsewhere herein.

In a first aspect, the first CFI value is used when the UE is operating using the first configuration, or the second CFI value is used when the UE is operating using the second configuration. In a second aspect, alone or in combination with the first aspect, the first configuration includes at least one of: an ultra-reliable low latency communications (URLLC) configuration, a shortened TTI (sTTI) configuration, a configuration with a latency requirement that is less than or equal to a threshold, a configuration with a reliability requirement that is greater than or equal to a threshold, or some combination thereof. In a third aspect, alone or in combination with one or more of the first and second aspects, the second configuration includes at least one of: an enhanced mobile broadband (eMBB) configuration, a legacy transmission time interval (TTI) configuration, a configuration with a latency requirement that is greater than or equal to a threshold, a configuration with a reliability requirement that is less than or equal to a threshold, or some combination thereof.

In a fourth aspect, alone or in combination with one or more of the first through third aspects, the PCFICH is not decoded based at least in part on determining that the UE is operating using the first configuration and not the second configuration. In a fifth aspect, alone or in combination with one or more of the first through fourth aspects, the PCFICH is decoded based at least in part on determining that the UE is operating using: the second configuration and not the first configuration, or both the first configuration and the second configuration. In a sixth aspect, alone or in combination with one or more of the first through fifth aspects, the first CFI value is used for communicating using the first configuration, and the second CFI value is used for communicating using the second configuration.

In a seventh aspect, alone or in combination with one or more of the first through sixth aspects, the second CFI value is required to be less than or equal to the first CFI value. In an eighth aspect, alone or in combination with one or more of the first through seventh aspects, the UE is configured to indicate an error if the second CFI value is greater than the first CFI value. In a ninth aspect, alone or in combination with one or more of the first through eighth aspects, the first CFI value is selected from multiple CFI values indicated in the message. In a tenth aspect, alone or in combination with one or more of the first through ninth aspects, the selection is based at least in part on a determination that the UE is operating in a subframe to which the first CFI value is to be applied. In an eleventh aspect, alone or in combination with one or more of the first through tenth aspects, the subframe is included in a set of subframes, indicated in the message, to which the first CFI value is to be applied.

In a twelfth aspect, alone or in combination with one or more of the first through eleventh aspects, the first configuration is a configuration where all components carriers of the UE are configured using one or more CFI values indicated in the message. In a thirteenth aspect, alone or in combination with one or more of the first through twelfth aspects, all of the component carriers are configured using a same CFI value indicated in the message. In a fourteenth aspect, alone or in combination with one or more of the first through thirteenth aspects, different ones of the component carriers are configured using different CFI values indicated in the message.

In a fifteenth aspect, alone or in combination with one or more of the first through fourteenth aspects, the second configuration is a configuration where no components carriers of the UE are configured using CFI values indicated in the message. In a sixteenth aspect, alone or in combination with one or more of the first through fifteenth aspects, the second configuration is a configuration where all component carriers of the UE are configured using one or more CFI values indicated in the PCFICH.

In a seventeenth aspect, alone or in combination with one or more of the first through sixteenth aspects, a first set of component carriers of the UE operates using the first configuration and a second set of component carriers of the UE operates using the second configuration. In an eighteenth aspect, alone or in combination with one or more of the first through seventeenth aspects, the first set of component carriers use the first CFI value and the second set of component carriers use the second CFI value. In a nineteenth aspect, alone or in combination with one or more of the first through eighteenth aspects, the first set of component carriers use a first set of CFI values indicated in the message. In a twentieth aspect, alone or in combination with one or more of the first through nineteenth aspects, the second set of component carriers use a second set of CFI values indicated in the PCFICH.

In a twenty-first aspect, alone or in combination with one or more of the first through twentieth aspects, the first CFI value is used for a first component carrier of the UE, and wherein one or more other CFI values, indicated in the message, are used for a corresponding one or more other component carriers of the UE. In a twenty-second aspect, alone or in combination with one or more of the first through twenty-first aspects, if the UE is configured with a CFI value in the message for a secondary cell when the secondary cell is operating using the second configuration, the UE is required to be configured with a CFI in the message for the secondary cell when the secondary cell is operating using the first configuration. In a twenty-third aspect, alone or in combination with one or more of the first through twenty-second aspects, the message is a radio resource control (RRC) message or a system information message carried in a system information block (SIB).

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
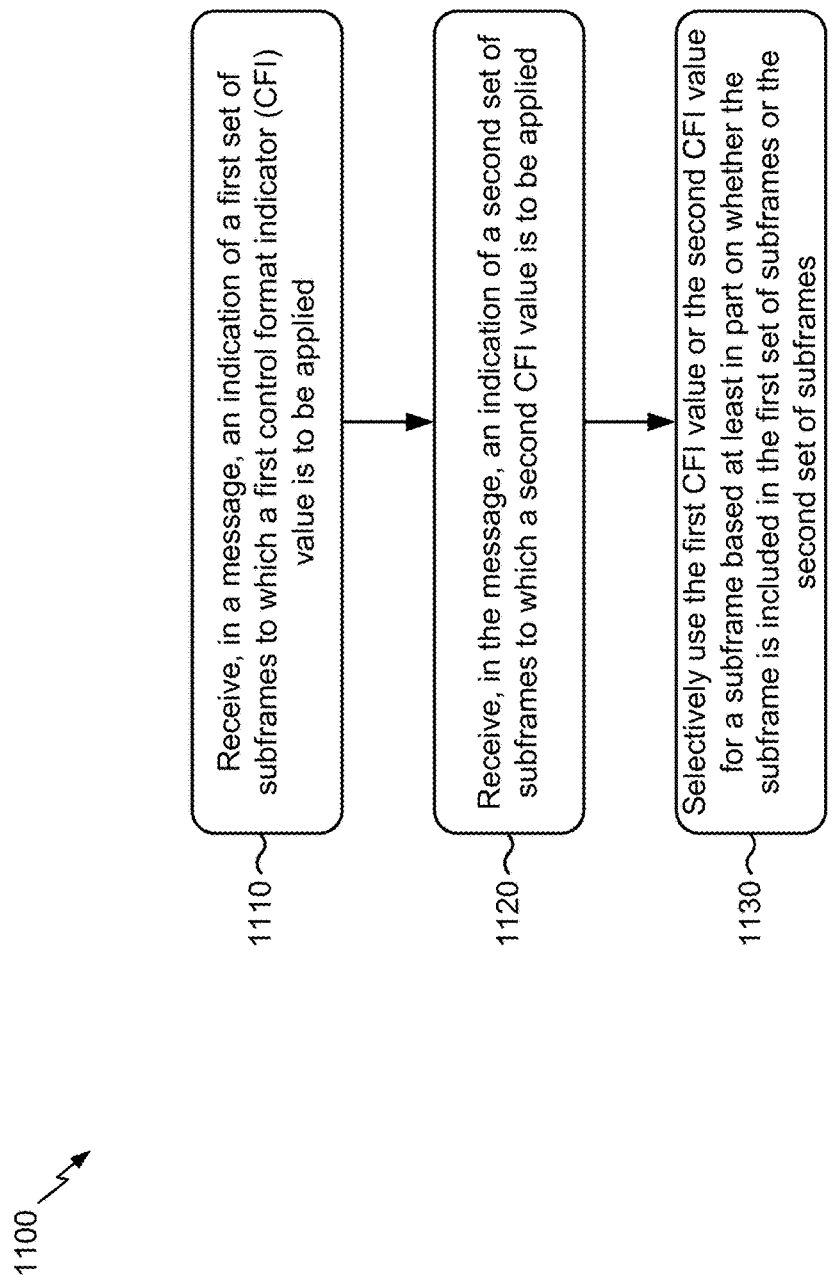

FIG. 11 is a diagram illustrating an example process 1100 performed, for example, by a UE, in accordance with various aspects of the present disclosure. Example process 1100 is an example where a UE (e.g., UE 120 and/or the like) performs operations associated with reliable indication or reception of a CFI value.

As shown in FIG. 11, in some aspects, process 1100 may include receiving, in a message, an indication of a first set of subframes to which a first CFI value is to be applied (block 1110). For example, the UE (e.g., using antenna 252, DEMOD 254, MIMO detector 256, receive processor 258, controller/processor 280, and/or the like) may receive, in a message, an indication of a first set of subframes to which a first CFI value is to be applied, as described above in connection with FIG. 8.

As further shown in FIG. 11, in some aspects, process 1100 may include receiving, in the message, an indication of a second set of subframes to which a second CFI value is to be applied (block 1120). For example, the UE (e.g., using antenna 252, DEMOD 254, MIMO detector 256, receive processor 258, controller/processor 280, and/or the like) may receive, in the message, an indication of a second set of subframes to which a second CFI value is to be applied, as described above in connection with FIG. 8.

As further shown in FIG. 11, in some aspects, process 1100 may include selectively using the first CFI value or the second CFI value for a subframe based at least in part on whether the subframe is included in the first set of subframes or the second set of subframes (block 1130). For example, the UE (e.g., using controller/processor 280 and/or the like) may selectively use the first CFI value or the second CFI value for a subframe based at least in part on whether the subframe is included in the first set of subframes or the second set of subframes, as described above in connection with FIG. 8.

Process 1100 may include additional aspects, such as any single aspect or any combination of aspects described below and/or in connection with one or more other processes described elsewhere herein.

In a first aspect, the first set of subframes includes subframes of a first type and the second set of subframes includes subframes of a second type. In a second aspect, alone or in combination with the first aspect, at least one of the first type or the second type is indicated in the message. In a third aspect, alone or in combination with one or more of the first and second aspects, the first type is a multicast-broadcast single-frequency network (MBSFN) subframe type and the second type is a non-MB SFN subframe type.

In a fourth aspect, alone or in combination with one or more of the first through third aspects, at least one of the first CFI value or the second CFI value is indicated in the message. In a fifth aspect, alone or in combination with one or more of the first through fourth aspects, at least one of the first CFI value or the second CFI value is not indicated in the message. In a sixth aspect, alone or in combination with one or more of the first through fifth aspects, at least one of the first CFI value or the second CFI value is hard coded in memory of the UE.

In a seventh aspect, alone or in combination with one or more of the first through sixth aspects, at least one of the first set of subframes or the second set of subframes is indicated using a bitmap. In an eighth aspect, alone or in combination with one or more of the first through seventh aspects, the message indicates at least one of: a first set of CFI values that map to the first set of subframes, a second set of CFI values that map to the second set of subframes, or some combination thereof. In a ninth aspect, alone or in combination with one or more of the first through eighth aspects, the message includes: an information element that indicates the first CFI value and the second CFI value, a first bitmap that maps the first CFI value or the second CFI value to each subframe included in the first set of subframes, and a second bitmap that maps the first CFI value or the second CFI value to each subframe included in the second set of subframes.

In a tenth aspect, alone or in combination with one or more of the first through ninth aspects, the message is a radio resource control (RRC) message or a system information block (SIB) message. In an eleventh aspect, alone or in combination with one or more of the first through tenth aspects, the first CFI value or the second CFI value is used for the subframe based at least in part on a determination that the UE is operating using a configuration with which a CFI value, received in the message, is to be used. In a twelfth aspect, alone or in combination with one or more of the first through eleventh aspects, the first CFI value or the second CFI value is used for the subframe based at least in part on a determination that the UE is not operating using a configuration with which a CFI value, received in a physical control format indicator channel (PCFICH), is to be used.

In a thirteenth aspect, alone or in combination with one or more of the first through twelfth aspects, the first set of subframes and the second set of subframes apply to all component carriers of the UE. In a fourteenth aspect, alone or in combination with one or more of the first through thirteenth aspects, the first set of subframes and the second set of subframes apply to a first component carrier of the UE. In a fifteenth aspect, alone or in combination with one or more of the first through fourteenth aspects, different subframe sets apply to one or more other component carriers of the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, in a message, an indication of a first set of subframes of a first type,
      wherein the first set of subframes is associated with a first control format indicator (CFI) value to be applied;
   receiving, in the message, an indication of a second set of subframes of a second type,
      wherein the second set of subframes is associated with a second CFI value to be applied;
   identifying that a subframe, in which the UE is operating, is included in the first set of subframes or the second set of subframes; and
   selectively using the first CFI value or the second CFI value for the subframe based at least in part on identifying that the subframe is included in the first set of subframes or the second set of subframes.

2. The method of claim 1, wherein at least one of the first type or the second type is indicated in the message.

3. The method of claim 1, wherein the first type is a multicast-broadcast single-frequency network (MBSFN) subframe type and the second type is a non-MBSFN subframe type.

4. The method of claim 1, wherein at least one of the first CFI value or the second CFI value is indicated in the message.

5. The method of claim 1, wherein at least one of the first CFI value or the second CFI value is not indicated in the message.

6. The method of claim 1, wherein at least one of the first CFI value or the second CFI value is hard coded in memory of the UE.

7. The method of claim 1, wherein at least one of the first set of subframes or the second set of subframes is indicated using a bitmap.

8. The method of claim 1, wherein the message indicates at least one of:
   a first set of CFI values that map to the first set of subframes, or
   a second set of CFI values that map to the second set of subframes.

9. The method of claim 1, wherein the message includes:
   an information element that indicates the first CFI value and the second CFI value,
   a first bitmap that maps the first CFI value or the second CFI value to each subframe included in the first set of subframes, and
   a second bitmap that maps the first CFI value or the second CFI value to each subframe included in the second set of subframes.

10. The method of claim 1, wherein the message is a radio resource control (RRC) message or a system information block (SIB) message.

11. The method of claim 1, wherein the first CFI value or the second CFI value is used for the subframe based at least in part on a determination that the UE is operating using a configuration with which a CFI value, received in the message, is to be used.

12. The method of claim 1, wherein the first CFI value or the second CFI value is used for the subframe based at least in part on a determination that the UE is not operating using a configuration with which a CFI value, received in a physical control format indicator channel (PCFICH), is to be used.

13. The method of claim 1, wherein the first set of subframes and the second set of subframes apply to all component carriers of the UE.

14. The method of claim 1, wherein the first set of subframes and the second set of subframes apply to a first component carrier of the UE.

15. The method of claim 14, wherein different subframe sets apply to one or more other component carriers of the UE.

16. A user equipment (UE) for wireless communication, comprising:
a memory; and
one or more processors operatively coupled to the memory, the memory and the one or more processors configured to:
receive, in a message, an indication of a first set of subframes of a first type,
wherein the first set of subframes is associated with a first control format indicator (CFI) value to be applied;
receive, in the message, an indication of a second set of subframes of a second type,
wherein the second set of subframes is associated with a second CFI value to be applied;
identify that a subframe, in which the UE is operating, is included in the first set of subframes or the second set of subframes; and
selectively use the first CFI value or the second CFI value for the subframe based at least in part on identifying that the subframe is included in the first set of subframes or the second set of subframes.

17. The UE of claim 16, wherein at least one of the first type or the second type is indicated in the message.

18. The UE of claim 16, wherein the first type is a multicast-broadcast single-frequency network (MBSFN) subframe type and the second type is a non-MBSFN subframe type.

19. The UE of claim 16, wherein at least one of the first CFI value or the second CFI value is indicated in the message.

20. The UE of claim 16, wherein at least one of the first CFI value or the second CFI value is not indicated in the message.

21. The UE of claim 16, wherein at least one of the first CFI value or the second CFI value is hard coded in memory of the UE.

22. The UE of claim 16, wherein at least one of the first set of subframes or the second set of subframes is indicated using a bitmap.

23. The UE of claim 16, wherein the message includes:
an information element that indicates the first CFI value and the second CFI value,
a first bitmap that maps the first CFI value or the second CFI value to each subframe included in the first set of subframes, and
a second bitmap that maps the first CFI value or the second CFI value to each subframe included in the second set of subframes.

24. The UE of claim 16, wherein the message is a radio resource control (RRC) message or a system information block (SIB) message.

25. The UE of claim 16, wherein the first CFI value or the second CFI value is used for the subframe based at least in part on a determination that the UE is not operating using a configuration with which a CFI value, received in a physical control format indicator channel (PCFICH), is to be used.

26. A non-transitory computer-readable medium storing a set of instructions for wireless communication, the set of instructions comprising:
one or more instructions that, when executed by one or more processors of a user equipment (UE), cause the UE to:
receive, in a message, an indication of a first set of subframes of a first type,
wherein the first set of subframes is associated with a first control format indicator (CFI) value to be applied;
receive, in the message, an indication of a second set of subframes of a second type,
wherein the second set of subframes is associated with a second CFI value to be applied;
identify that a subframe, in which the UE is operating, is included in the first set of subframes or the second set of subframes; and
selectively use the first CFI value or the second CFI value for the subframe based at least in part on identifying that the subframe is included in the first set of subframes or the second set of subframes.

27. The non-transitory computer-readable medium of claim 26, wherein at least one of the first type or the second type is indicated in the message.

28. The non-transitory computer-readable medium of claim 26, wherein the first type is a multicast-broadcast single-frequency network (MBSFN) subframe type and the second type is a non-MBSFN subframe type.

29. The non-transitory computer-readable medium of claim 26, wherein at least one of the first CFI value or the second CFI value is indicated in the message.

30. The non-transitory computer-readable medium of claim 26, wherein at least one of the first CFI value or the second CFI value is not indicated in the message.

31. The non-transitory computer-readable medium of claim 26, wherein at least one of the first CFI value or the second CFI value is hard coded in memory of the UE.

32. The non-transitory computer-readable medium of claim 26, wherein at least one of the first set of subframes or the second set of subframes is indicated using a bitmap.

33. The non-transitory computer-readable medium of claim 26, wherein the message includes:
an information element that indicates the first CFI value and the second CFI value,
a first bitmap that maps the first CFI value or the second CFI value to each subframe included in the first set of subframes, and
a second bitmap that maps the first CFI value or the second CFI value to each subframe included in the second set of subframes.

34. The non-transitory computer-readable medium of claim 26, wherein the message is a radio resource control (RRC) message or a system information block (SIB) message.

35. The non-transitory computer-readable medium of claim 26, wherein the first CFI value or the second CFI value is used for the subframe based at least in part on a determination that the UE is not operating using a configuration with which a CFI value, received in a physical control format indicator channel (PCFICH), is to be used.

36. An user equipment (UE) for wireless communication, comprising:
means for receiving, in a message, an indication of a first set of subframes of a first type, wherein the first set of subframes is associated with a first control format indicator (CFI) value to be applied;

means for receiving, in the message, an indication of a second set of subframes of a second type,
wherein the second set of subframes is associated with a second CFI value to be applied;

means for identifying that a subframe, in which the UE is operating, is included in the first set of subframes or the second set of subframes; and means for selectively using the first CFI value or the second CFI value for the subframe based at least in part on identifying that the subframe is included in the first set of subframes or the second set of subframes.

37. The UE of claim 36, wherein at least one of the first type or the second type is indicated in the message.

38. The UE of claim 36, wherein the first type is a multicast-broadcast single-frequency network (MBSFN) subframe type and the second type is a non-MBSFN subframe type.

39. The UE of claim 36, wherein at least one of the first CFI value or the second CFI value is indicated in the message.

40. The UE of claim 36, wherein at least one of the first CFI value or the second CFI value is not indicated in the message.

41. The UE of claim 36, wherein at least one of the first CFI value or the second CFI value is hard coded in memory of the UE.

42. The UE of claim 36, wherein at least one of the first set of subframes or the second set of subframes is indicated using a bitmap.

43. The UE of claim 36, wherein the message includes:
an information element that indicates the first CFI value and the second CFI value,
a first bitmap that maps the first CFI value or the second CFI value to each subframe included in the first set of subframes, and
a second bitmap that maps the first CFI value or the second CFI value to each subframe included in the second set of subframes.

44. The UE of claim 36, wherein the message is a radio resource control (RRC) message or a system information block (SIB) message.

45. The UE of claim 36, wherein the first CFI value or the second CFI value is used for the subframe based at least in part on a determination that the UE is not operating using a configuration with which a CFI value, received in a physical control format indicator channel (PCFICH), is to be used.

* * * * *